March 3, 1931.   H. B. BURDICK   1,794,581
VALVE
Filed Jan. 9, 1928

H. B. Burdick
INVENTOR

BY *Victor J. Evans*
ATTORNEY

WITNESS:

Patented Mar. 3, 1931

1,794,581

UNITED STATES PATENT OFFICE

HIRAM B. BURDICK, OF ROANOKE, VIRGINIA

VALVE

Application filed January 9, 1928. Serial No. 245,582.

This invention relates to a valve, the general object of the invention being to provide a valve for an attachment for a spigot, whereby the closing of the valve will cause the attachment to operate as a sanitary drinking fountain and by opening the valve, the water will flow through the attachment from the spigot in the ordinary manner.

This invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:—

Figure 1:
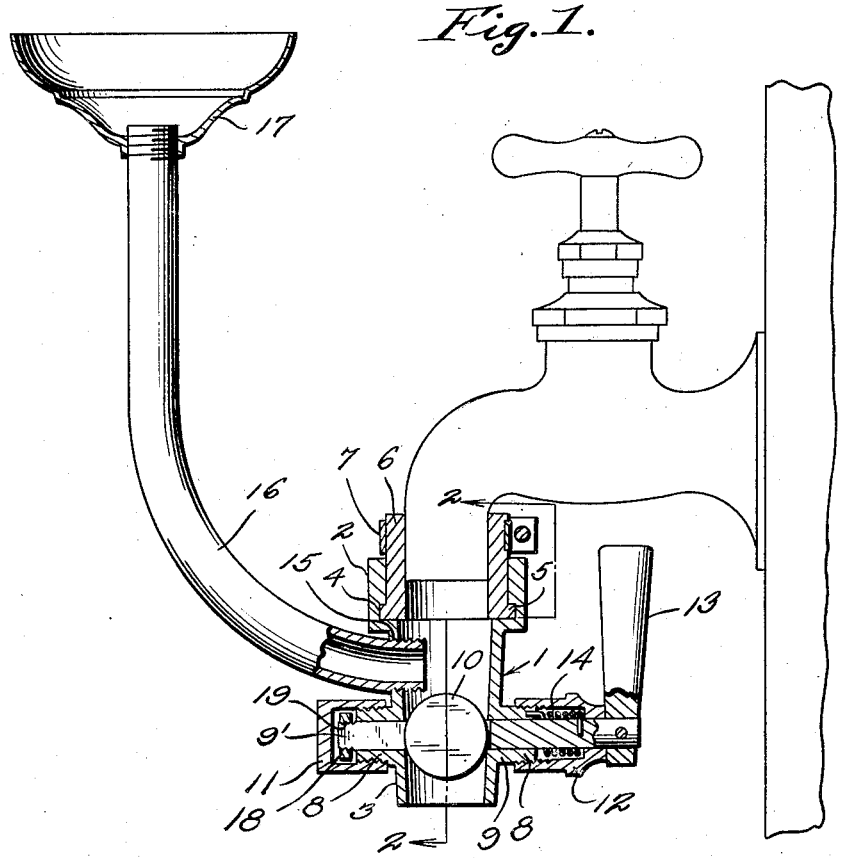
Figure 1 is an elevation with parts in section, showing the attachment connected with the spigot.
Figure 2:
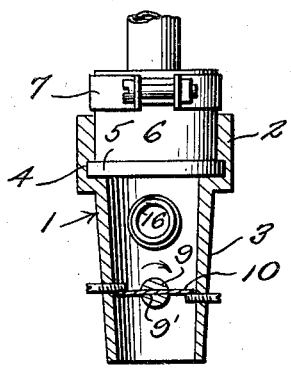
Figure 2 is a section on line 2—2 of Figure 1.
Figure 3:
Figure 3 is a view of the stem of the valve.

In these views, 1 indicates the body of the attachment which is of tubular construction and is formed with an enlarged cylindrical top part 2 and a downwardly tapered lower part 3, the upper part having the annular interior groove 4 therein for receiving the flange 5 of a resilient ring-shaped gasket 6 which projects from the body and is adapted to fit around the outlet of the spigot. This gasket is clamped around the spigot by the clamping ring 7. The lower part 3 is provided with the oppositely arranged nipples 8 through which passes the stem 9 of the disk valve 10. A cap 11 fits over the front nipple and a cap 12 fits over the rear nipple, this cap 12 having a hole therein through which the stem extends and a handle 13 is fastened to this extended end. A spring 14 surrounds the stem and is located in the cap 12 and has one end attached to the stem and its other end to the nipple, said spring tending to hold the parts with the valve 10 in open position. A threaded hole 15 is formed in the part 3, above the front nipple and the threaded end of a curved pipe 16 is placed in said hole. A cup-shaped member 17 is screwed to the threaded upper end of the pipe and acts to receive the water passing from the pipe, this water draining back through the pipe 16 when the valve 10 is open.

The stem 9 is provided with a slot 9' to receive the disk valve 10, and after the stem is placed through the nipples, a nut 18 is placed on the threaded end 19 of the stem which causes the split part of the stem to clamp the disk in place. This nut also acts to hold the stem in position.

From the foregoing it will be seen that the attachment can be easily and quickly placed on a spigot by pushing the gasket over the outlet end of the spigot and in clamping the gasket on the spigot by the clamping ring. The spring 14 holds the valve in open position so that water will pass through the device from the spigot and thus the spigot can be used for ordinary uses. When a person wishes to take a drink, he would turn the handle 13 to close the valve 10, and then by opening the spigot, the water flowing into the attachment will pass upwardly through the tube 16 and be projected upwardly from the pipe so that a person can secure a drink in the same manner that he would secure a drink from a drinking fountain. The water not consumed will drop back into the cup 17 and flow back through the pipe 16 when the valve 10 is open.

Thus I have provided a simple drinking fountain attachment for a spigot which can be manufactured to sell at low cost and which can be easily and quickly put in place and which will not interfere with the ordinary uses of the spigot when in place.

It is thought from the foregoing description that the advantages and novel features of my invention will be readily apparent.

It is to be understood that I may make changes in the construction and in the combination and arrangement of the several parts, provided that such changes fall within the scope of the appended claims.

What I claim is:—

1. A device of the class described comprising a tubular body having a pair of oppositely arranged nipples intermediate its ends, a valve stem passing through the body and the nipples, one end of the stem being slotted, a disk valve passing through the slot and located in the body, a nut on the slotted end of the stem for causing the slotted parts of the stem to clamp the valve between them and to hold the stem in the nipples and a handle connected with the unslotted end of the stem for turning the same to open and close the valve.

2. A device of the class described comprising a tubular body having a pair of oppositely arranged nipples intermediate its ends, a valve stem passing through the body and the nipples, one end of the stem being slotted, a disk valve passing through the slot and located in the body, a nut on the slotted end of the stem for causing the slotted parts of the stem to clamp the valve between them and to hold the stem in the nipples, a handle connected with the unslotted end of the stem for turning the same to open and close the valve, a cap on each nipple, one cap having a hole therein for the passage of the handle end of the stem and a spring in this cap having one end connected with the stem and its other end to the nipple, for holding the valve normally open.

In testimony whereof I affix my signature.

HIRAM B. BURDICK.